March 25, 1930. I. L. FRIEDLAENDER 1,751,512
HOLD-DOWN DEVICE FOR AUTOMOBILES
Filed Aug. 27, 1928
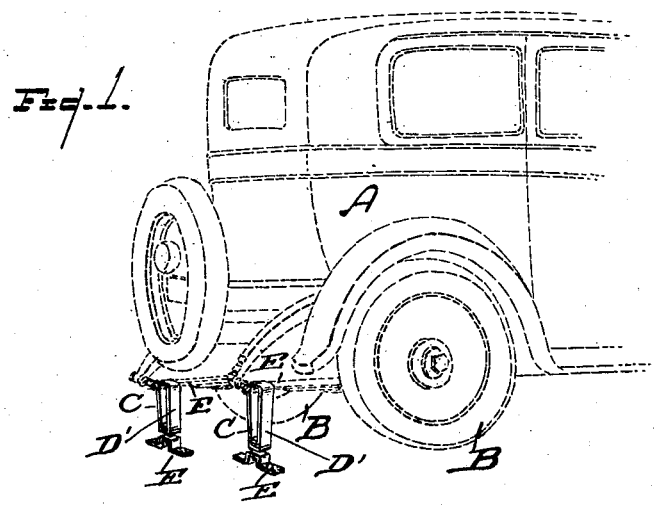
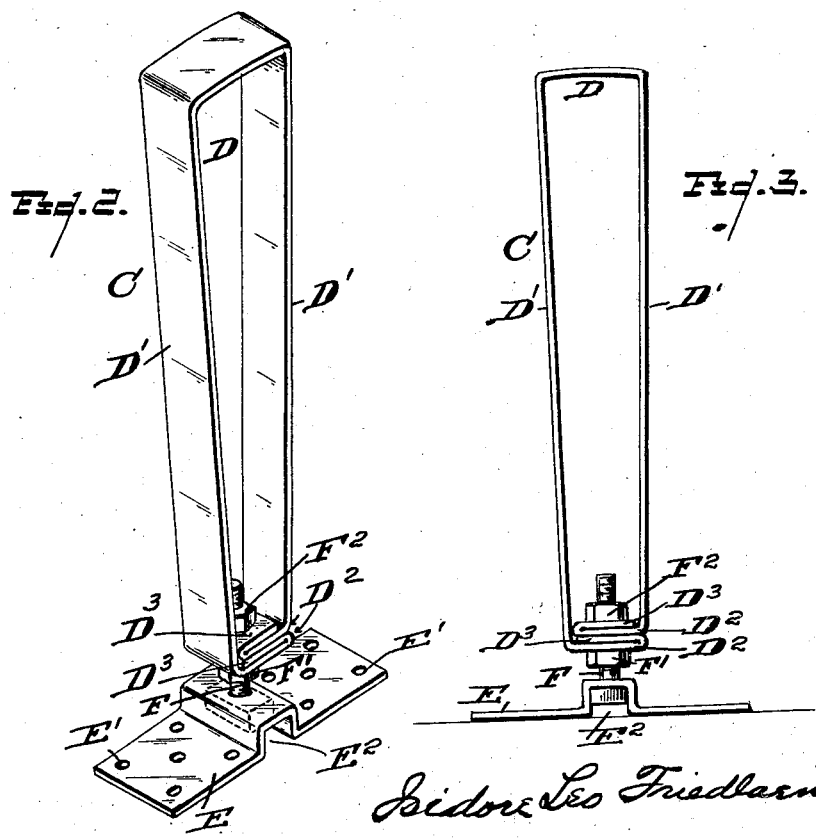
Inventor
Isidore Leo Friedlaender
By S. E. Thomas
Attorney Patented Mar. 25, 1930

1,751,512

UNITED STATES PATENT OFFICE

ISIDORE LEO FRIEDLAENDER, OF DETROIT, MICHIGAN

HOLD-DOWN DEVICE FOR AUTOMOBILES

Application filed August 27, 1928. Serial No. 302,266.

My invention relates to a device for anchoring automobiles to the floor of a freight car, ship, or other means employed for transporting vehicles.

The primary object of the present invention is to provide a hold-down device for automobiles which is simple and of inexpensive construction,—may be readily applied and is adapted to effectually secure the vehicle against any tendency to shift from its position upon the floor or deck while in transit.

A further object of the invention is to provide an adjustable device including a looped portion for engaging the spring, axle or other part of an automobile, connected with a footing secured to the floor which may be rotatably adjusted with reference to the looped portion in order that the footing may be placed to avoid cracks or knot-holes in the floor or deck that a suitable nailing support may be obtained.

A further object of the invention is to provide a degree of flexibility between the hold-down device and the vehicle, whereby the vehicle may automatically adjust itself to the shocks caused by curves or other variations of the railroad track.

A further object of the invention is to provide means for regulating the altitude of the hold-down device to the foot member through the adjustment of a connecting bolt.

A further object of the invention is to provide means adapted to snugly embrace the edges of the springs of a vehicle to insure against slippage or lateral movement.

Another feature of the invention is the ease with which the device may be adjusted, due to the location of the locking and adjustable nuts for securing the looped member to the floor footing, the nuts being situated adjacent the latter and therefore readily accessible for adjustment.

With the foregoing and other objects in view which will appear as the description proceeds, the invention further resides in the combination and arrangement of parts and in the details of construction hereinafter described and claimed, it being understood that changes may be made in the precise embodiment of the invention herein disclosed without departing from the spirit of the same.

In the drawings accompanying the specification:

Figure 1 is a fragmentary view of an automobile graphically shown in dotted lines indicating the application of the hold-down device to the springs of a vehicle to secure the latter to a car or other floor.

Figure 2 is a perspective view of the hold-down device on a relatively larger scale.

Figure 3 is an elevation of the device showing the head of a bolt connecting the floor member with the looped member straddling the springs of the vehicle,—the head of the bolt being held against rotation by the side walls of the foot member.

Referring now to the letters of reference placed upon the drawings:

A denotes a motor vehicle. B indicates the rear wheels of the vehicle resting upon the floor of a freight car or other support.

C denotes the hold-down or anchoring device consisting of a strip of sheet metal D, bent into U-shaped form to provide a pair of downwardly extending legs $D^1$ adapted to straddle the springs E of the motor vehicle. The end of the legs $D^1$ are bent at right angles and overlap each other, forming shoes $D^2$ with return bends $D^3$ overlapping the respective right-angle portion of the legs to increase the thickness of the wall of the shoe;— it being apparent that in the event of any lifting tendency of the vehicle when anchored by the device to the floor that the overlapping marginal ends will have no tendency to separate but on the contrary will be drawn together.

E denotes a foot-plate provided with a plurality of perforations $E^1$ to receive nails for securing it to a floor or deck. The foot-plate E is formed with an inverted channel $E^2$ extending transversely across the plate,—or a socket may be provided to receive the head of a bolt, struck up from body of the plate. F indicates a bolt projecting upwardly through a hole in the channel wall, the head of the bolt being held against turning by the side walls of the channel. The bolt F also extends through apertures in the foot portions of the hold-down device D and is fitted above and below the foot portions with a pair of nuts F¹, F² upon adjusting which the altitude of the looped portion of the device may be regulated to adapt it to the springs or other engaged part of the automobile, to be anchored to the floor.

It will be obvious that four or more of the devices are employed to secure the forward and rear springs of the vehicle to the car floor, and if desired the anchoring devices may also be connected with the axles or other parts of the vehicle.

Having thus described my invention what I claim is:

1. A device of the character described, comprising a single strip of sheet metal bent into substantially U-shape form to provide legs adapted to straddle a part of the vehicle, the ends of the legs being bent inwardly in overlapping relation and punched with registering bolt holes; a floor plate formed of sheet metal; means for securing the floor plate to the floor; a bolt relatively short extending through the floor plate and through the overlapping ends of the U-shape member; means between said floor plate and said bolt for maintaining the bolt in substantially vertical position against turning movement; and nuts screwed upon said bolt to adjustably secure the U-shape member on the bolt.

2. A device of the character described, comprising a single strip of metal bent into substantially U-shape form to provide legs adapted to straddle a part of the vehicle, the ends of the legs being bent inwardly in overlapping relation and punched with registering bolt holes; a foot-plate formed of sheet metal with a channel and a hole through the wall of the channel, said foot-plate being also perforated for nails to secure said plate to a floor; a bolt extending through said hole in the channel wall of the foot-plate and through the holes in the inwardly bent portions of the U-shape member, the head of said bolt being lodged in the recess formed in the foot-plate; and nuts screwed upon the bolt above and below the inwardly bent portion of the legs of the U-shape member, whereby the altitude of the U-shape member may be regulated and secured against lateral movement when adjusted.

3. In a device of the character described, comprising a single strip of metal bent into substantially U-shape form to provide legs adapted to straddle a part of the vehicle, the ends of the legs being bent inwardly in overlapping relation with registering bolt holes through the overlapping portions; a foot-plate formed of sheet metal with an inverted channel portion extending transversely across the plate midway of its length, with a hole through the channel wall for the passage of a bolt, said foot-plate being also perforated to receive nails, whereby the foot-plate may be secured to a floor; and a headed bolt, having its head lodged between the walls of the channel, extending through the channel hole in the wall of the foot-plate and through the holes in the inwardly bent portions in the U-shape member; and nuts screwed upon the bolt above and below the inwardly bent portions of the legs of the U-shape member, whereby the altitude of the U-shape member may be regulated and secured against displacement when adjusted.

4. In a device of the character described, comprising a single strip of metal bent into substantially U-shape form to provide legs adapted to straddle a part of the vehicle, the legs adjacent their ends being bent inwardly in overlapping relation with the marginal ends of the respective legs having a return bend superposed upon the inwardly bent portion of the respective legs; said inwardly bent portions having registering openings therein; a foot-plate of sheet metal formed with an inverted channel extending transversely across the plate and a hole through a wall of the channel, said foot-plate being also perforated to receive nails, whereby the foot-plate may be secured to a floor; a headed bolt having its head lodged in the channel of the foot-plate and extending through the hole in the wall of the latter up through the openings provided in the overlapping inwardly bent portions of the U-shape member; and a pair of nuts screwed upon said bolt above and below the inwardly bent portions of the U-shape member, whereby upon adjusting said nuts the altitude of said U-shape member may be regulated and afterwards secured.

5. In a device of the character described, a one-piece metal, substantially U-shaped member adapted to straddle a part of the vehicle, the free ends of the legs of the substantially U-shaped member being directed inwardly into overlapping relation and provided with openings, a floor plate, a threaded bolt secured to the floor plate against turning movement therein, said bolt passing through the openings in the inwardly directed overlapping ends of the substantially U-shaped member, and nuts operable on the threaded bolt above and below said inwardly bent portions whereby to adjustably mount and support the substantially U-shaped member directly on the bolt and maintain the said member spaced from said floor plate.

6. In a device of the character described, a floor plate, a threaded bolt secured in substantially vertical position on the plate against turning movement thereon, a member adapted to straddle a part of a vehicle and having overlapping portions provided with aligning holes which embrace the bolt above the floor plate, and nuts on the threaded bolt to clamp said overlapping portions tightly together on said bolt and thereby support said member wholly from said bolt.

7. In a device of the character described, a floor plate provided with a channel, a headed threaded bolt secured on the plate, with the head of the bolt mounted in the channel of the plate and movable vertically in the channel, a member adapted to straddle a part of the vehicle and having connection with said bolt, and means engageable with said member and operable on the threads of the bolt to adjust said member and to maintain the member supported wholly on the said bolt.

In testimony whereof, I sign this specification.

ISIDORE LEO FRIEDLAENDER.